United States Patent [19]

Baur

[11] 4,179,381

[45] Dec. 18, 1979

[54] INTAKE DISTRIBUTOR FOR A SETTLING TANK FILTER

[75] Inventor: Rolf Baur, Heubach-Lautern, Fed. Rep. of Germany

[73] Assignee: Schenk-Filterbau Gesellschaft mit beschränkter Haftung, Waldstetten, Fed. Rep. of Germany

[21] Appl. No.: 963,201

[22] Filed: Nov. 24, 1978

[30] Foreign Application Priority Data

Nov. 24, 1977 [DE] Fed. Rep. of Germany ....... 2752486

[51] Int. Cl.² .............................................. B01D 29/42
[52] U.S. Cl. .................................................... 210/456
[58] Field of Search ................ 210/330, 331, 344–347, 210/456, 279, 291, 292, 421

[56] References Cited

U.S. PATENT DOCUMENTS

| 685,881 | 11/1901 | Theurer | 210/344 |
| 3,016,147 | 1/1962 | Cobb et al. | 210/456 X |
| 3,429,443 | 2/1969 | Stern | 210/456 X |

FOREIGN PATENT DOCUMENTS 428577 9/1911 France ..................................... 210/330

*Primary Examiner*—William A. Cuchlinski, Jr.

*Attorney, Agent, or Firm*—Becker & Becker, Inc.

[57] ABSTRACT

An intake distributor for a settling tank filter with horizontally arranged filter elements which are located one above the other on a vertical hollow shaft arranged centrally in the tank while at the upper end of the inner tank chamber there is provided an annular chamber which is coaxial with the axis of the tank. This annular chamber on one hand communicates with the inlet and, on the other hand, through a coaxial annular slot or gap communicates with the interior of the tank. A suspension comprising a carrier liquid and a filter substance or an auxiliary filter means is passed through the annular chamber or annular slot in the interior of the tank, and the filter substance or auxiliary filter means while being circulated is settled on the filter elements. The inlet to the annular chamber is divided into at least two branches which lead at equal angular distances into the annular chamber. The flow cross section of the annular slot is considerably less than the flow cross section of the inlet. In the inner tank chamber outside the annular slot there are provided deflector members for the suspension leaving through the annular gap which deflector members serve for reducing the energy and speed of the flow.

12 Claims, 3 Drawing Figures

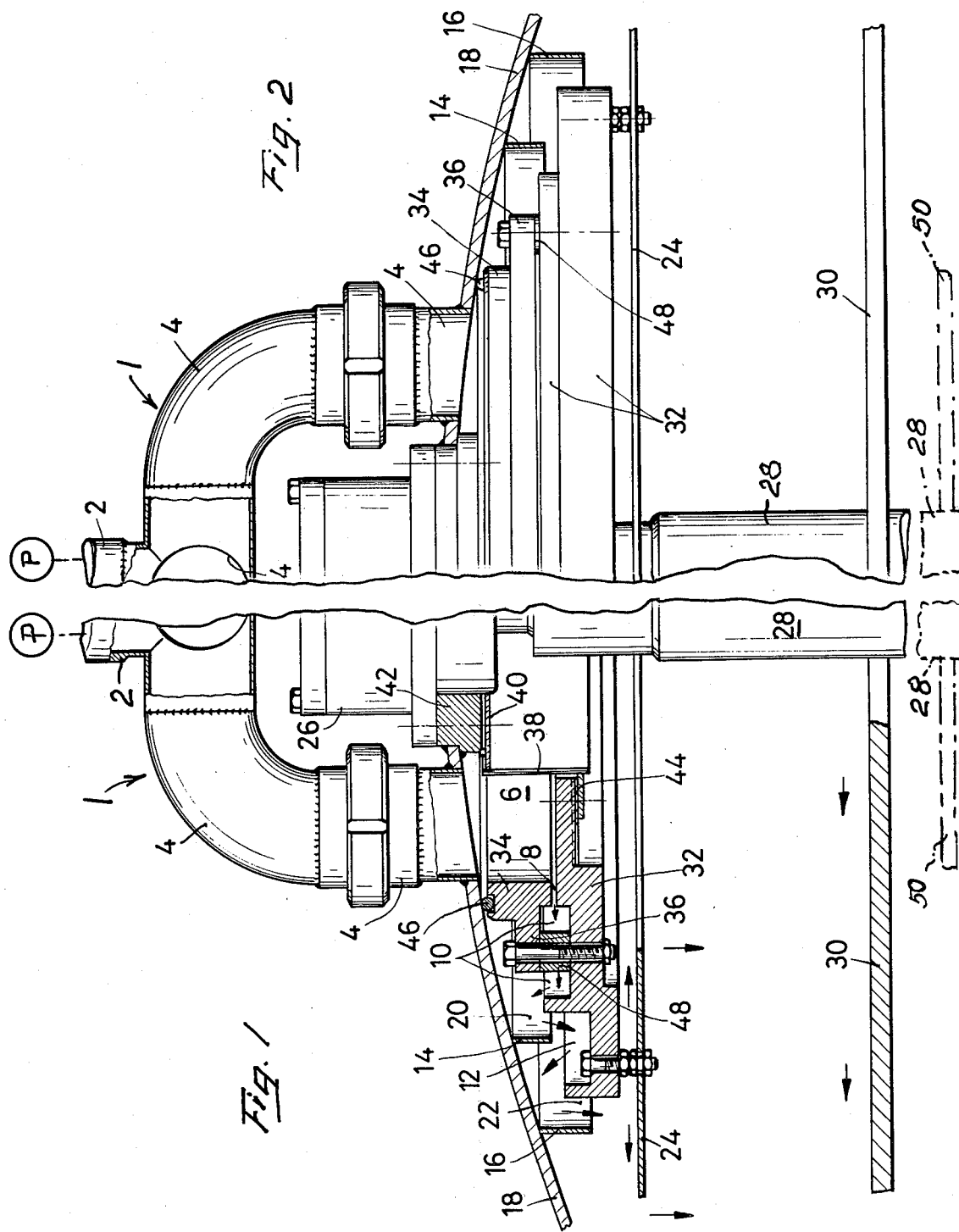

INTAKE DISTRIBUTOR FOR A SETTLING TANK FILTER

The present invention relates to an intake distributor for a settling tank filter with horizontally arranged filter elements which are located one above the other on a vertical hollow shaft arranged centrally in the tank while at the upper end of the inner chamber of the tank there is provided an annular chamber which is coaxial with the axis of the tank. More specificatlly, the present invention relates to an intake distributor of the above mentioned type in which the annular chamber, on the one hand, communicates with the inlet and, on the other hand, through a coaxial annular slot or gap communicates with the interior of the tank, and in which a suspension comprising a carrier liquid and a filter substance or auxiliary filter means is passed through an annular chamber and an annular slot into the interior of the tank, and the filter substance or auxiliary filter means is while being circulated settled on the filter elements.

Settling tank filters of the above mentioned type are employed for filtering liquids. For forming a pre-coat, the suspension, which in a carrier liquid contains the filter substance or the auxiliary filter means, is passed, while being circulated, through the filter tank. In this connection the filter substance or the auxiliary filter means is by a dosing device supplied to the carrier liquid for forming the suspension. This operation is carried out until the intended quantity of filter substance or auxiliary filter means has settled on the filter elements, namely the filter plates which are arranged one above the other on the central hollow shaft and which are provided with screens or sieves.

In view of the centrally arranged hollow shaft, the suspension can be introduced only eccentrically so that the problem arises nevertheless to obtain a uniform deposit. For instance, attempts have failed to obtain a uniform deposit by having intake passages lead into the interior of the tank in certain directions, for instance, tangentially to an annular passage.

It is, therefore, an object of the present invention to provide an intake distributor of the above mentioned general type according to which the filter substance or the auxiliary filter means settled on the filter elements will be of equal thickness over the entire surface of the filter elements.

It is another object of this invention to provide an intake distributor as set forth in the preceding paragraph, according to which a uniformly distributed grain or particle size will be obtained over the entire filter surface.

It is still another object of this invention to provide an intake distributor as outlined in the two preceding paragraphs, in which the auxiliary filter means will not become demixed during the settling operation.

These and other objects and advantages of the invention will appear more clearly from the following specification in connection with the accompanying drawing, in which:

FIG. 1 is an axial section through the upper end of the filter tank and its cover according to the invention and also shows a cover plate provided above the uppermost filter plate.

FIG. 2 is a side view of the device of FIG. 1 and shows the intake pipes.

Figure 3:
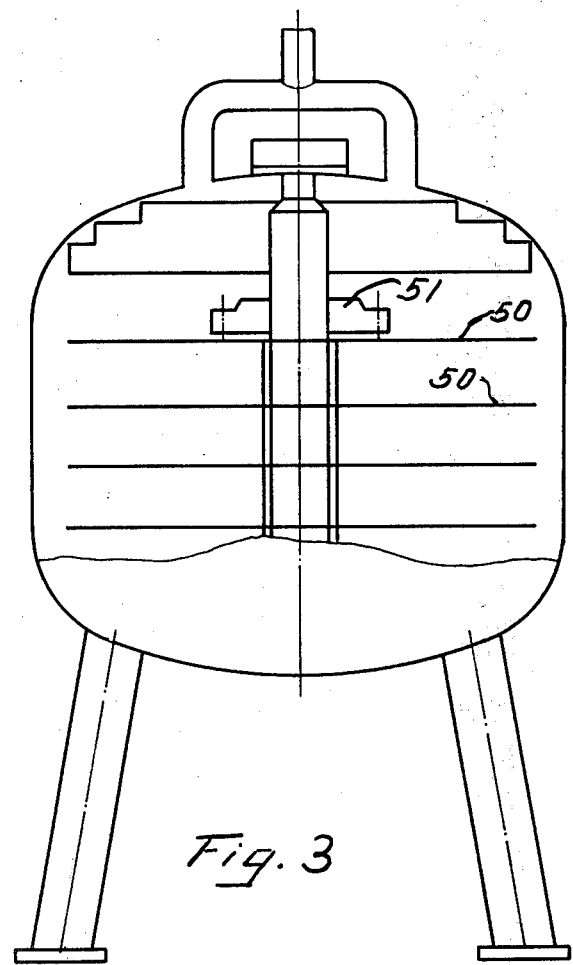

FIG. 3 diagrammatically illustrates by way of example an intake distributor according to the invention built into a suitable filter known per se as it may be used e.g. in breweries.

The intake distributor according to the present invention is characterized primarily in that the inlet to the annular chamber is subdivided into two or more branches which lead at the same angular distance into the annular chamber, and is furthermore characterized in that the flow cross section of the annular gap or slot is substantially less than the flow cross section of the inlet, and is also characterized in that in the inner chamber of the tank outside the annular gap there are provided deflector means for the suspension leaving the annular gap, the deflector means serving for reducing the energy and speed of the flow.

Due to the subdivision of the inlet into a plurality of branches which lead at the same angular distances into the annular chamber, the supply to the annular chamber will be more symmetrical than would be the case if only a single inlet pipe were provided.

To make sure that the suspension does not shoot at a high speed out of the annular gap into the interior of the tank, deflecting members are provided which convert the flow energy to a major portion into heat and which reduce the flow speed to a just still admissible very low value. The suspension then sinks in the form of a turbid substance uniformly downwardly in the interior of the tank and is uniformly distributed over the individual filter elements. This results in the desired uniform settling of the auxiliary filter means.

According to a further development of the invention, an annular vat is provided into which the annular slot or gap is leading. The wall of the annular vat which is located opposite the annular gap forms a baffle plate for the shooting-in flow of liquid and effects the first deflection of this flow. During this deflection of the flow, energy is withdrawn from the flow.

While the annular gap could principally also lead inwardly against the shaft, according to a preferred embodiment, the annular gap is directed outwardly. This brings about that the flow cross section increases adjacent the annular gap. Several annular vats arranged in the manner of cascades may also be provided which serve for further reducing the energy.

According to a still further embodiment of the invention, hoods are provided which in a reliable manner see to it that the liquid, after leaving an annular vat, cannot skip the next following deflector.

Finally, according to a further development of the invention, the last deflector is formed by a horizontal annular baffle plate over which the suspension is first distributed before it leaves the baffle plate along its outer as well as its inner rim and sinks slowly downwardly in the form of a turbid substance.

Referring now to the drawing in detail, a central inlet pipe 2 is branched into four branch pipes 4 which are spaced from each other by an angular distance of 90°. These branch pipes 4 lead from the top in an axially parallel manner into the annular chamber 6. At the bottom of the annular chamber 6 there is provided a radially outwardly directed annular gap or slot 8 which is surrounded by an annular vat 10. The annular vat 10 in its turn is surrounded by a further annular vat 12 which is located somewhat lower than the annular vat 10. The annular chamber 6 and the annular vats are arranged coaxially with regard to each other. Similarly, annular cylindrical metal strips 14 and 16 are coaxially so connected to the cover 18 of the filter tank that they surround the overflows of the annular vats 10 and 12 in such a way that respectively two passages 20, 22 are formed. These passages 20, 22 respectively lead toward the bottom of the annular vat 12 and the annular baffle plate 24, the annular baffle plate 24 being designed as annular sheet metal part which is located horizontally below the passage 22.

In a bearing housing 26 there is journalled the upper end of the coaxial shaft 28 which serves for subjecting the filter plates 50 to a centrifuging action. The individual device 51 for holding the filter plates in pressed-on condition has been diagrammatically shown in FIG. 3. The covering metal sheet located above the uppermost filter plate has been designated with the reference numeral 30.

The elements of the intake distributor which form the annular chamber 6 and the annular vats 10 and 12 include a multi-step annular structural member 32, a ring 34 with an outer flange 36, a pipe section 38, and an annular plate 40 which is connected to the annular pipe section 38. The annular plate 40 is from below connected to a ring 42 which is connected to the cover 18 and which surrounds a central upper opening of the tank, the central upper opening forming a passage for the shaft 28. All elements of the intake distributor which are located inside the tank, with the exception of the cylindrical metal strips 14 and 16, are together from below screwed to the ring 42. The multi-step annular structural member 32 is screwed to the extensions 44 of the pipe section 38 and is screwed to the outer flange 36 of the ring 34. Between the members 32 and 34 there are provided spacer members 48 which determine the width of the annular gap 8. The ring 34 is sealed by an O-ring 46 with regard to the cover 18. Finally, the annular baffle plate 24 is spaced from the lower step of the annular member 32 and is screwed to the latter from below.

For emptying the residual liquid from the annular vats 10 and 12, there are provided outlet passage which have not been shown.

Operation

The suspension which is supplied through the pipe 2 is distributed to the four branch pipes 4 and thus passes into the annular chamber 6 at equal angular distances. The flow cross section of the annular gap 8 forms the decisive throttling area within the entire intake distributor. Consequently, in the direction upstream from the gap there is building up a pressure generated by the delivery pump, which pressure brings about a uniform outflow of the suspension through the annular gap 8. The suspension shoots into the annular vat 10, flows around the spacer sleeves 48 and hits the outer wall of the annular vat 10. The liquid flowing upwardly from the annular vat 10 is by means of the cover 18 and the metal strip 14 deflected downwardly into the annular vat 12. From the vat 12, the liquid is by the cover 18 and the metal strip 16 deflected downwardly against the baffle plate 24 which it hits in considerably calmed down condition. Here the suspension splits up and in part flows radially inwardly and in part radially outwardly and at the inner and outer rim of the baffle plate 24 sinks downwardly as a turbid substance.

This turbid substance of the suspension sinks slowly downwardly onto the cover plate 30 of the filter packet. From here the suspension flows radially outwardly in calmed down condition and uniformly flows downwardly into the non-illustrated cylindrical space between the cylindrical tank wall and the filter packet. The suspension is then divided and flows into the horizontal spaces between the individual filter plates. The carrier liquid flows through the filter fabric and from there into the filtrate discharge shaft 28, while the auxiliary filter means uniformly deposits on the filter plates. As auxiliary filter means may be employed filter materials, such as diatomaceous earth, perlite, active carbon, synthetic granulate cellulose and other known filter materials. The arrows indicated in the drawing show the main direction of flow of the suspension.

As will be seen from the above, the present invention creates a very uniform inflow of the suspension into the filter tank filled with the carrier liquid and does so at a very low inflow speed without thereby requiring more time for introducing the filter substance or the auxiliary filter means than heretofore known customary settling methods. In particular, the settling time can even be reduced.

It is, of course, to be understood that the present invention is, by no means, limited to the specific showing in the drawing but also comprises any modifications within the scope of the appended claims.

Thus, instead of the four branch pipes extending at a right angle with regard to each other, also another number of branch pipes may be provided, for instance three or more than four, which again are arranged at equal angular distances from each other. Also another number of annular vats may be provided. With a slower feeding-in speed, a single annular vat will suffice, whereas with a higher feeding-in speed, three or more annular vats may be necessary. The bottoms of all annular vats may be located at the same level. This is particularly advantageous when the filter tank has a plane cover.

Furthermore, the annular gap 8 may be arranged at the level of the bottom of the annular vat 10. Finally, instead of being directed radially outwardly, the annular gap 8 could also be directed upwardly or downwardly.

What I claim is:

1. An inlet distributor for a settling tank filter, which includes: a vertical shaft arranged centrally and adapted to receive horizontally extending filter elements one above the other, annular chamber means coaxially arranged with regard to said vertical shaft, inlet conduit means spaced at equal angles from each other and leading into said annular chamber means, said annular chamber means having an annular slot associated therewith for fluid communication with said tank filter, said annular slot being coaxial with said vertical shaft, and having a flow cross section relatively small with regard to the flow cross section of said inlet conduit means, and deflecting means arranged in fluid communication with and located outside of said annular slot for reducing the flow energy and flow velocity of fluid from said annular chamber means.

2. An inlet distributor according to claim 1, in which said annular slot has an inside diameter of from 1 to 12 mm.

3. An inlet distributor according to claim 2, in which said annular slot has an inside diameter of from 2 to 7 mm.

4. An inlet distributor according to claim 1, in which said annular slot leads radially outwardly from said annular chamber means.

5. An inlet distributor according to claim 1, which includes at least one annular vat communicating with and surrounding said annular slot.

6. An inlet distributor according to claim 5, in which said at least one annular vat is arranged coaxially with regard to said annular chamber means.

7. An inlet distributor according to claim 1, which includes at least two annular vats communicating with and surrounding said annular slot, said vats being arranged in a cascade manner.

8. An inlet distributor according to claim 7, in which said at least two annular vats have overflow means and are arranged coaxially with regard to each other, and which includes baffle plate means located below the overflow means of the outermost annular vat, said baffle plate means comprising a substantially horizontally arranged annular sheet metal member substantially coaxial with said outermost annular vat.

9. An inlet distributor according to claim 7, in which said at least two vats comprise a common annular member stepped radially outwardly and in axial direction.

10. An inlet distributor according to claim 9, which includes: spacer means associated with said stepped annular member and determining the width of said annular slot, a filter cover connected to said inlet conduit means, a ring connected to said cover and having said stepped annular member connected to said ring, and sealing ring means interposed between said ring and said cover.

11. An inlet distributor according to claim 1, which includes: an innermost annular vat and at least another annular vat surrounding said innermost annular vat and being in fluid communication therewith, and hood means covering up at least said innermost annular vat and defining therewith passage means directed toward an adjacent one of said deflecting means.

12. An inlet distributor according to claim 11, in which said hood means comprises a section forming a part of a cover for the settling tank filter and has downwardly extending coaxial metal strips connected thereto in radially spaced relationship to each other.

* * * * *